US012493825B2

(12) United States Patent
Quader et al.

(10) Patent No.: US 12,493,825 B2
(45) Date of Patent: Dec. 9, 2025

(54) SELECTING A HIGH COVERAGE DATASET

(71) Applicant: International Business Machines Corporation, Armonk, NY (US)

(72) Inventors: Shaikh Shahriar Quader, Scarborough (CA); Aindrila Basak, Edmonton (CA); Adrian Mahjour, Toronto (CA); Petr Novotny, Mount Kisco, NY (US); Carlo Appugliese, Seminole, FL (US); Berthold Reinwald, San Jose, CA (US); Dheeraj Arremsetty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 17/893,367

(22) Filed: Aug. 23, 2022

(65) Prior Publication Data

US 2024/0070522 A1  Feb. 29, 2024

(51) Int. Cl.
*G06N 20/00* (2019.01)
*G06F 18/21* (2023.01)
*G06F 18/22* (2023.01)
*G06F 18/40* (2023.01)

(52) U.S. Cl.
CPC ........... *G06N 20/00* (2019.01); *G06F 18/217* (2023.01); *G06F 18/22* (2023.01); *G06F 18/40* (2023.01)

(58) Field of Classification Search
None
See application file for complete search history.

(56) References Cited

U.S. PATENT DOCUMENTS

| 11,295,234 | B2 | 4/2022 | Ardhanari |
| 2018/0012143 | A1* | 1/2018 | Hansen ................. G06F 9/46 |
| 2020/0050968 | A1* | 2/2020 | Lee ..................... G06N 20/00 |
| 2020/0342265 | A1 | 10/2020 | Cai |
| 2021/0342642 | A1 | 11/2021 | Shabtay |
| 2023/0370520 | A1* | 11/2023 | Shetty ................. H04L 41/147 |

FOREIGN PATENT DOCUMENTS

CN  111612146 A  *  9/2020 ............ G06F 18/22

OTHER PUBLICATIONS

Bachem et al., "Practical Coreset Constructions for Machine Learning", Jun. 4, 2017, 39 pps., <https://arxiv.org/abs/1703.06476>.

(Continued)

*Primary Examiner* — Xuyang Xia
(74) *Attorney, Agent, or Firm* — David K. Mattheis

(57) ABSTRACT

Providing a representative dataset from an initial dataset by accessing a dataset associated with a machine learning model, receiving input parameters associated with the representative dataset selection, the input parameters including an evaluation metric, determining a density of a plurality of datapoints associated with the dataset, training a first iteration of a machine learning model using a first data point selected according to the density, determining a first value of the evaluation metric for the first iteration of the machine learning model, generating a representative subset based on the first value of the evaluation metric value, and providing the representative dataset and a final machine learning model trained using the representative dataset.

17 Claims, 4 Drawing Sheets

(56) References Cited

OTHER PUBLICATIONS

Clark, "OptiSim: An Extended Dissimilarity Selection Method for Finding Diverse Representative Subsets", J. Chem. Inf. Comput. Sci. 1997, 37, 6, 1181-1188, Publication Date:Nov. 24, 1997, <https://doi.org/10.1021/ci970282v>.

Kennard et al., "Computer Aided Design of Experiments", Feb. 1969, Technometrics, vol. 11, No. I, pp. 137-148, <http://libpls.net/publication/KS_1969.pdf>.

Lai et al., "Exploring high-dimensional data through locally enhanced projections", Journal of Visual Languages & Computing, 13 pps., <https://doi.org/10.1016/j.jvlc.2018.08.006>.

Mall et al., "FURS: Fast and Unique Representative Subset selection retaining large-scale community structure", Published: Oct. 22, 2013, Social Network Analysis and Mining vol. 3, pp. 1075-1095, <https://doi.org/10.1007/s13278-013-0144-6>.

Mell et al., "The NIST Definition of Cloud Computing", National Institute of Standards and Technology, U.S. Department of Commerce, NIST Special Publication 800-145, Sep. 2011, 7 pages.

Tremblay et al., "Determinantal Point Processes for Coresets", Journal of Machine Learning Research 20 (2019) 1-69, Submitted Mar. 2018; Revised Oct. 2019; Published Nov. 2019, <https://arxiv.org/abs/1803.08700>.

Williamson et al., "Understanding Collections of Related Datasets Using Dependent MMD Coresets", Information 12, No. 10, 2021, 27 pages.

\* cited by examiner

SELECTING A HIGH COVERAGE DATASET

FIELD OF THE INVENTION

The disclosure relates generally to the selection of representative sample data from a large data set. The invention relates particularly to the selection of a representative set of data samples having high coverage in the original larger dataset.

BACKGROUND

Development of a machine learning (ML) model may include defining the problem to be solved and the nature of the solution—the insights to be gleaned from use of the model. An initial dataset may be gathered and qualified as representing the problem to be solved and the envisioned solution. A minimum prediction accuracy may be defined which satisfies the business and technical aspects of the problem. The dataset may be prepared for use in training and validating the model, the dataset may be divided into training and test sets, including a test validation dataset as well. The model may be trained using the training dataset and the trained model may be validated using the test dataset and the tuning validation dataset. The final tuned model may then be deployed for use relative to the problem. Large initial datasets may necessitate computationally complex and expensive training, validation and tuning phases.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable simplifying ML computations by selecting a high coverage representative dataset from an initial dataset.

Aspects of the invention disclose methods, systems and computer readable media associated with providing a representative dataset from an initial dataset by accessing a dataset associated with a machine learning model, receiving input parameters associated with the representative dataset selection, the input parameters including an evaluation metric, determining a density of a plurality of datapoints associated with the dataset, training a first iteration of a machine learning model using a first data point selected according to the density, determining a first value of the evaluation metric for the first iteration of the machine learning model, generating a representative subset based on the first value of the evaluation metric value, and providing the representative dataset and a final machine learning model trained using the representative dataset.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
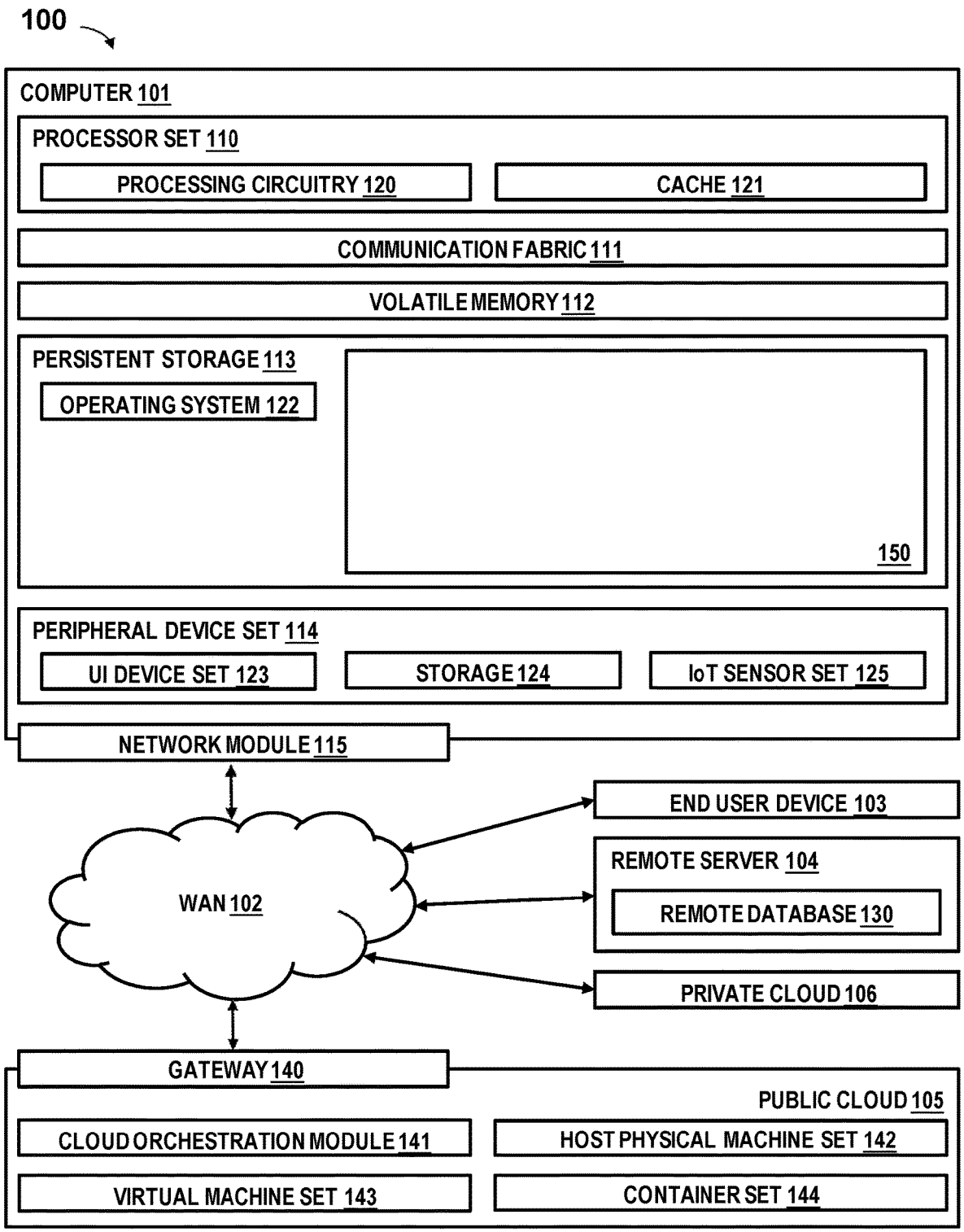
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

A representative dataset may be used for obtaining insights and observation about the entire dataset. The representative dataset if a small subset of an initial dataset which proportionally reflects characteristics in the initial dataset. Representative datasets offer the possibility of reduced computational complexity and resource requirement but obtaining truly representative datasets can be difficult. Disclosed embodiments provide methods and systems enabling the provision of representative datasets embodying the characteristics of initial datasets at reduced complexity and resource costs.

Aspects of the present invention relate generally to altering a standard ML model development pipeline by providing a representative dataset derived from an initial or original dataset prepared for the model development. In embodiments, evaluation of the initial dataset includes determining point density throughout the dataset and defines a working budget for acquiring a representative dataset. Methods select a point from a high-density region, determine the nearest neighbors of the selected point and remove the neighbors from consideration, methods then determine levels of dissimilarity between the selected point and all remaining points in the initial set, and place the selected point and the most dissimilar points having a positive impact upon model performance metrics, in the representative set. The process iterates using the most dissimilar point as the starting point, until all points in the initial set have been considered or rendered inactive, or until the defined budget has been exhausted. Methods determine a coverage for the representative set and repeat the overall process with differing neighborhood sizes and budget limits, then selecting a representative set having a coverage level optimized in terms of the budget and neighborhood sizes. Methods then provide the selected representative set as an input to the ML model development pipeline in order to reduce the computational resource loading and computational complexity of the model development pipeline. In an embodiment, iterations cease when neighborhood size and budget changes fail to yield performance improvements in coverage. According to aspects of the invention, the representative dataset selection program system automatically and dynamically adjusts the representative set to provide representative coverage across the original dataset. Coverage, as used herein relates the ratio of the number of points in the initial dataset which may be reached directly from a member of the selected representative dataset, divided by the total number of points in the initial dataset.

In accordance with aspects of the invention methods automatically select points for a representative dataset embodying the characteristics of an initial dataset and therefore, usable in training machine learning models associated with the initial dataset. Methods include selecting an initial point in the initial dataset according to the point density of the initial dataset. Methods then determine the effect of a particular point to a training data set has upon an evaluation metric of the target machine learning model. Methods then deselect the nearest neighbors of the point added to the representative set, followed by determining the dissimilarity between the initial point and all remaining points in the dataset. Methods than add the initial point and the most dissimilar second point to the representative dataset. The process repeats, using the most dissimilar point as the new starting point. Iterations proceed until either all points have been considered, or a defined budget limit has been reached. In an embodiment, methods define the budget limit as a number of allowed representative points. After defining a representative set, methods determine a coverage for the set. Methods then repeat the process using different values for the defined budget limit and the neighborhood size used for deselecting nearest neighbors. Iterations yield a representative set space defined in terms of the neighborhood size and budget limits and their affects upon the representative set. Methods then provide an optimized representative set for the purpose of training and refining a machine learning model.

Aspects of the invention provide an improvement in the technical field of machine learning system development. Conventional ML system developments utilize large datasets associated with the ML task at hand. Such large datasets carry a high overhead cost in terms of computational complexity and computational costs. In many cases, a smaller representative dataset could be used in model development but selecting to a truly representative dataset is difficult. Exiting selection methods fail to consider both data density and data similarity in making selections from an initial dataset for the smaller dataset. As such, the smaller dataset fails to include all characteristics of the initial set. This failure carries over to the developed model which fails to encompass all the features of the original dataset in the model's performance. As a result, the developed model fails to provide usable results. Implementations of the invention leverage both the data density and data dissimilarity in selecting representative datasets, carry over representative features from the initial dataset to the smaller representative dataset for use in training and validating the ML models. This provides the improvement of achieving a desired outcome for the user (i.e., providing deployable models which address all aspects of the problem, which may be user-defined) while at the same time avoiding the disadvantages associated with a large initial dataset.

Aspects of the invention also provide an improvement to computer functionality. In particular, implementations of the invention are directed to a specific improvement to the development of ML systems from concept to deployable models, embodied in the selection of representative datasets from initial datasets such that the selected datasets actually represent the original datasets. In embodiments, the systems and methods select the representative dataset according to the data density and data similarities of the original dataset, together with the incremental improvement in model performance demonstrated by the addition of individual data points to a training dataset, thereby carrying the features of the original dataset over into the representative dataset. Providing a high level of coverage of the original dataset with a minimal number of representative dataset points. For each ML model development, methods select a representative dataset tuned to the unique aspects of the initial dataset associated with the particular model development. As a result of adjusting the selection process according to neighborhood size and budget constraints, methods select datasets embodying the data characteristics of the original dataset. Systems and methods increase the likelihood that the system will provide a representative dataset which enables model development with a lower computational complexity and fewer computational resources. In this manner, embodiments of the invention affect how the ML development pipeline functions (i.e., the likelihood of providing an actually representative dataset) from one ML model development task to the next.

As an overview, an ML model development system constitutes an artificial intelligence application executed on data processing hardware that develops, trains, tunes and refines, and deploys ML models pertaining to a given subject-matter problem. The development system receives inputs from various sources including input over a network, a corpus of electronic documents or other data, forming a large dataset associated with the target problem. Systems divide the large data set into training and testing dataset, though the training dataset may still be unworkably large in terms of the necessary computational complexity and resources necessary to use the dataset in training the ML model. After training, the testing dataset provides a means to validate the trained model and refine the model parameters to provide reliable answers associated with the target problem. Disclosed embodiments enable improvements in ML model development by reducing the size of the initial training dataset to a more workable representative dataset without the typical sacrifices in dataset features which usually accompany dataset size reductions.

In an embodiment, one or more components of the system can employ hardware and/or software to solve problems that are highly technical in nature (e.g., accessing a large dataset, determining a data point density for the dataset, determining model performance associated with the addition of the data point to a training dataset, generating a representative dataset according to the performance improvement, etc.). These solutions are not abstract and cannot be performed as a set of mental acts by a human due to the processing capabilities needed to facilitate lower complexity and cost ML model development, for example. Further, some of the processes performed may be performed by a specialized computer for carrying out defined tasks related to selecting a representative dataset for ML model development. For example, a specialized computer can be employed to carry out tasks related to representative dataset selection, or the like.

In an embodiment, systems and methods access a dataset associated with an ML problem. Such a dataset may contain text, image, numeric, CSV, or other types of data associated with the problem. Each data point may be represented by a multi-dimensional vector embedding of the features of the data point enabling the dataset to be configured as a multi-dimensional vector space associated with eh vector embeddings of the data points. At the outset, methods and systems define a neighborhood size in terms of a distance and a budget in terms of a number of data points or a percentage of the original dataset size. The neighborhood size and the budget may be specified by the user, or these parameters can take some default values which are empirically learned by applying this sampling method on many datasets. Initially, all values in the original dataset have an "active" status label. The active status label indicates that each such data point represents a candidate for inclusion within the representative dataset.

In an embodiment, systems and methods determine a datapoint density for each point of the dataset, according to the distance between each point and all neighboring points in the multi-dimensional dataset space. In this embodiment, methods and systems may determine the distance between two points using a geodesic distance calculation, where the geodesic distance dist$\gamma$ between any two points $x_i$ and $x_j$ in X, can be defined as: dist$\gamma$(xi, xj)=inf{L($\sigma$)}, where inf{L($\sigma$)} represents the infimum over the lengths of all the smooth paths $\sigma$ connecting the two points $x_i$ and $x_j$.

After determining the set of distances between each possible pairing of datapoints, methods and systems determine a density, such as a unit density, for each point according to the respective point-to-point distances. In an embodiment, systems and methods determine a density for each point according to the distances between points and the defined neighborhood size, defining the density as the number of points within the current neighborhood size for each point of the dataset. After determining a density for each point, systems and methods order the datapoints in terms of their determined density from a highest density to a lowest density.

In an embodiment, selection of points for the representative subset begins with the selection of the data point having the highest density among the points of the dataset as the first data point of the representative dataset. Following this selection, systems and methods train an iteration of the target machine learning model using the selected point and determine a value for the evaluation metric specified by the user, for the trained model. Methods then alter the status label of all points in the defined neighborhood of the selected point from active candidates for selection, to inactive and unavailable for selection.

Following the status change for all points within the neighborhood distance from the initially selected point, systems and methods determine a dissimilarity for the initially selected point and all active points in the dataset, the non-neighbor points falling outside the neighborhood distance from the first selected point. In an embodiment, methods and systems determine dissimilarity according to the pairwise geodesic distance between point pairs. Methods and systems then add the point having the greatest dissimilarity with the selected point—that point having the greatest geodesic distance from the selected point—to the selected points of a new training dataset subset of points as the second point. The method then repeats, training a new model iteration, evaluating the iteration, comparing the evaluation to the previous evaluation, and adding the potential candidate to the representative set when the model evaluation shows improvement in model performance, then setting the status label for all points within the current neighborhood distance of the second point to inactive, determining the dissimilarity between the second point and all currently active points, and selecting the active point having the greatest dissimilarity to the second point as the third point for the representative subset of points, the fourth such point, and so on. Systems and method set the status label of each point selected for addition to the representative set to inactive.

In an embodiment, this iterative set of steps: setting the status labels of all active points within the neighborhood distance of the most recently selected point to inactive, determining the most dissimilar point to the recently selected point, and selecting that point as the next potential addition to the representative set of points, with an accompanying new model training and evaluation iteration culminating with a comparison of new and previous model evaluation metrics, continues until either the number of selected points in the representative set reaches the budget limit defined by the user for this overall iteration, or until all points in the original dataset have a status label of inactive. For instances where all points of the original set have been set to inactive, systems and methods reset the status labels of all points not currently added to the representative set back to active and resume the overall process of determining that point within the set of active points having the highest density, adding that point to the new training set, training and evaluating a new model as described above, and after adding the potential candidate to the representative set, setting all points in the neighborhood of that point to inactive, determining the most dissimilar point with respect to that points, adding that most dissimilar point to the representative set, and so on, until the current point budget for the representative set has been reached. Methods set candidate points added to the representative set and those not added to inactive.

In an embodiment, once the point budget has been reached, systems and methods determine a coverage value for the current representative set. In this embodiment, coverage denotes the ratio of the number of points within the respective neighborhoods of those points in the representative set, considered to be those points which are directly reachable from the set of selected data points, and the total number of points in the original dataset. In this embodiment, systems and methods use the current coverage in making adjustments to the neighborhood size value to achieve a maximal coverage by the representative subset of the original dataset.

In an embodiment, where the representative sample selections process has achieved a high coverage, i.e., a positive number close to, but less than 1.0, before reaching the budget, or an embodiment where the coverage doesn't improve between successive iterations with differing neighborhood sizes, the sampling process stops early and provides the selected data points and the updated budget value to the user. In an edge case scenario, when no more candidate points are available for further consideration, before reaching the budget, all the inactivate points not already included in the representative subset can be activated. The neighborhood size can be reduced to a smaller value, such as decreasing the current neighborhood size value by 1. Disclosed systems and methods may then restart the selection process with the now re-activated candidate points and the new neighborhood size.

Table 1 provides comparison data for the coverage of exemplary datasets by embodiments of the invention and by the FURS (fast and Unique Representative Subset) selection retaining method, and OptiSim, an extended dissimilarity selection method, for selecting representative datasets. As illustrated by the data of the table, the current invention, Rep-Subset, achieved higher levels of coverage for the exemplary datasets than either FURS, or OptiSim.

TABLE 1

| DATASET | Data Statistics | | Coverage | | |
|---|---|---|---|---|---|
| | # Rows | # Features | Rep-Subset | FURS | OptimSim |
| Breast Cancer | 569 | 32 | 0.86 | 0.81 | 0.72 |
| Wine Quality | 4898 | 12 | 0.93 | 0.88 | 0.56 |
| Magic | 19020 | 11 | 0.83 | 0.84 | 0.67 |
| Credit Card | 30000 | 24 | 0.87 | 0.84 | 0.63 |
| Animals | 30475 | 85 | 0.91 | 0.89 | 0.76 |
| MNIST | 60000 | 784 | 0.64 | 0.51 | 0.37 |

Table 2 provides computation time data according to the budget in terms of a percentage of the original dataset. As shown in the table, increasing the budget carries a penalty in the form of increasing the computational time required to select the representative subset of points. All tests utilized a common hardware configuration comprising 296 GB RAM, and 12 cores.

TABLE 2

| DATASET | Data Statistics | | Computation time for subset size (seconds) | | | | | |
|---|---|---|---|---|---|---|---|---|
| | # Rows | # Feat. | 2% | 3% | 5% | 10% | 15% | 20% |
| Breast Cancer | 569 | 32 | 0.11 | 0.17 | 0.21 | 0.31 | 0.31 | 0.34 |
| Wine Quality | 4898 | 12 | 0.17 | 0.17 | 0.22 | 0.35 | 0.39 | 0.47 |
| Magic | 19020 | 11 | 0.15 | 0.17 | 0.21 | 0.39 | 0.44 | 0.59 |
| Credit Card | 30000 | 24 | 0.14 | 0.15 | 0.29 | 0.33 | 0.45 | 0.57 |
| Animals | 30475 | 85 | 0.19 | 0.18 | 0.38 | 0.46 | 0.61 | 0.77 |
| MNIST | 60000 | 784 | 0.28 | 0.37 | 0.72 | 1.33 | 1.96 | 2.31 |

Table 3 provides evaluation data for model training performance utilizing 100% of the original dataset for training the respective models, using the current Rep-Subset invention for selecting a training subset of the original set, and using a randomly selected subset of a size equivalent to that selected by the Rep-Subset process steps. As illustrated in the table, current embodiments provide an improvement in trained model accuracy relative to randomly selected representative subsets. All Table 3 evaluations were conducted on a common hardware configuration including 16 GB RAM and 6 cores.

TABLE 3

| Model Name | MNIST | | | Credit Card | | | Wine | | |
|---|---|---|---|---|---|---|---|---|---|
| | Full | Rep-Sub | Random Selection | Full | Rep-Sub | Random Selection | Full | Rep-Sub | Random Selection |
| Logistic Regression | 91% | 97% | 95% | 78% | 78% | 77% | 47% | 47% | 46% |
| K-neighbor classifier | 96% | 96% | 96% | 76% | 74% | 73% | 47% | 43% | 42% |
| Naïve Bayes Classifier | 81% | 79% | 84% | 38% | 36% | 35% | 44% | 40% | 43% |
| Decision tree classifier | 81% | 85% | 81% | 73% | 75% | 72% | 57% | 57% | 47% |
| Random Forest Classifier | 90% | 93% | 90% | 81% | 81% | 80% | 64% | 60% | 52% |
| XGBOOST | 92% | 95% | 94% | 81% | 82% | 79% | 65% | 62% | 52% |

As shown in FIG. 1, computing environment 100 contains an example of an environment for the execution of at least some of the computer code involved in performing the inventive methods, such as currently disclosed representative data subset selection processes, block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
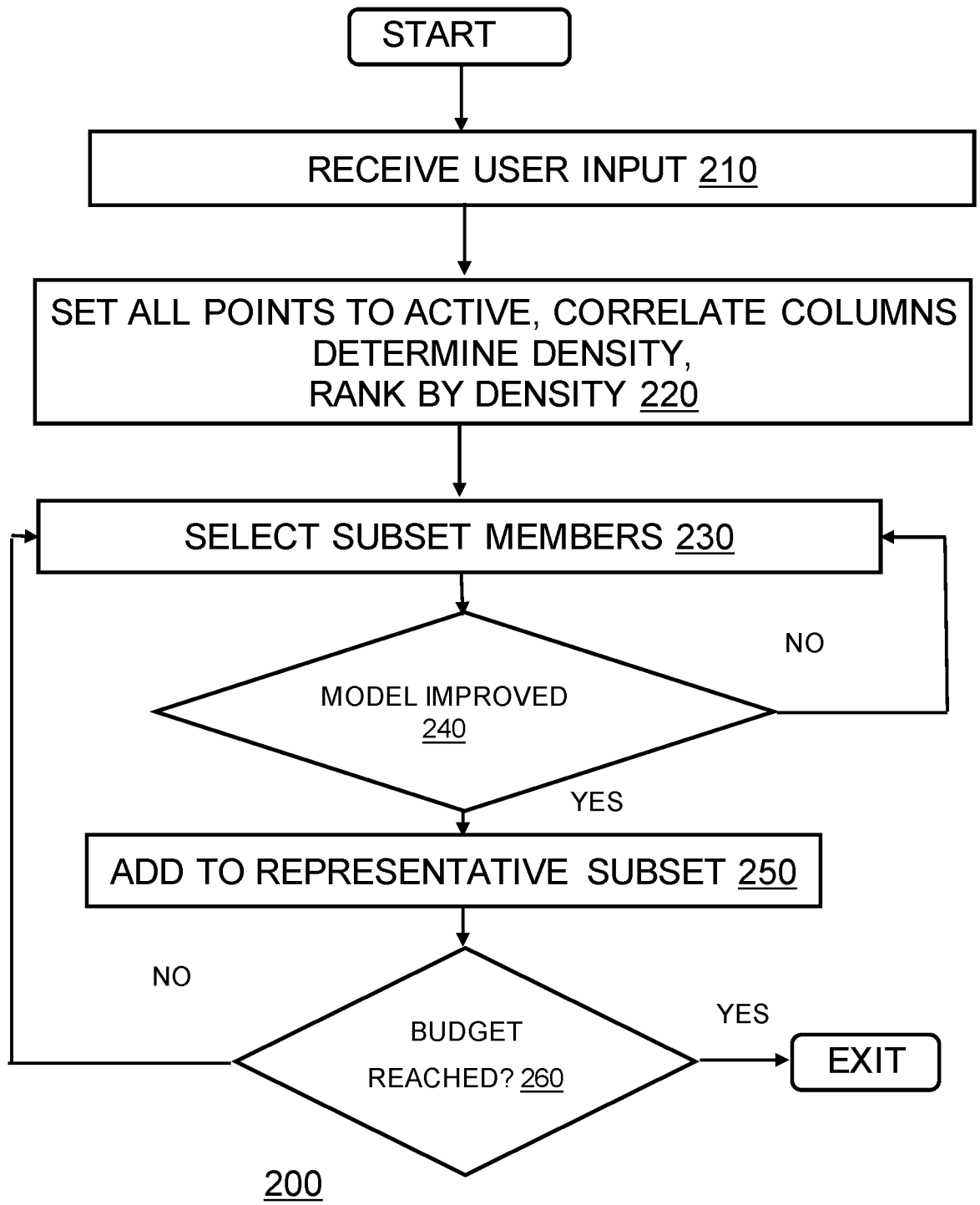
FIG. 2 provides a flowchart depicting an operational sequence, according to an embodiment of the invention.

FIG. 2 provides a flowchart 200, illustrating exemplary activities associated with the practice of the disclosure. After program start at block 210, representative sample selection program 150, access a large training dataset and receives user input including neighborhood size, a model evaluation metric such as model accuracy, a dataset target column for classification or regression, and a desired budget expressed as an absolute sample size, or a sample size as a percentage of the overall dataset.

At block 220, systems and methods using program 150, set all original data set points to an active status, compute a density value for each original point in terms of distances to neighbors and/or the number of adjacent points present in the currently defined neighborhood size of a point, and order the original points in terms of the computed density. In an embodiment, systems and methods further determine pairwise correlations between all columns in the dataset to the target column provided as user input. In this embodiment, systems and methods ignore all columns lacking significant correlation, e.g., columns having a determined correlation of less than 50%, retaining only those columns having significant correlation to the target column.

At block 230, representative sample selection program 150 iterates through steps including selecting the point having the highest density value for inclusion in the representative sample subset, setting the status of all points within the neighborhood of that selected point, including the selected point itself, to an inactive status. Systems and methods then train an iteration of the intended machine learning model using the representative sample set containing the first point. Methods and systems evaluate the trained model according to the user provided evaluation metric and associate the evaluation metric value with the current representative sample subset. Systems and methods then return to the set of still active points and select the active point having the highest density for potential inclusion in the representative subset. Methods and systems add the potential candidate to all previously selected points, forming a new training dataset. Methods and systems then train another iteration of the machine learning model using the new training set. Evaluation of the new iteration of the machine learning model yields a new value for the evaluation metric. Methods and systems compare the new evaluation metric value to the previous evaluation metric value at block 240. Systems and methods add potential candidate data points associated with an improvement in model performance as indicated by a change in the evaluation metric, to the representative candidate set at 250, and check to see if the user provided sample size has been reached at 260. If the sample size has not been reached, methods return to block 230, all points in the neighborhood of the point to inactive and proceed as described above. Method mark points which fail to improve model performance as inactive and resume the candidate evaluation process as described above using the next most dense point After adding a point to the dataset, methods and systems sett all other points in the neighborhood of the added point to inactive and then determines a dissimilarity between all active points and the previously added point using, for example, pairwise geodesic distances. Methods select the point having the greatest dissimilarity to the recently added point and again train another iteration of the machine learning model using the previous training set plus the most dissimilar point. An evaluation of the new iteration of the model determines if the method add the new point to the sample data set, or not. These iterations continue until the user defined point budget/sample size is reached at 260, leading to an exit, or until all points in the original dataset have been set as inactive.

The method and system evaluate the current representative set to determine if the budget has been reached. For embodiments where all points are evaluated and set as inactive prior to reaching the designated budget value, the method resets the status label of all points not currently selected as members of the representative subset back to active, and begins the iterative selection process again, starting with whichever active point has the highest density value and proceeding as described above.

After the sample size has been reached, systems and methods determines a coverage value for the representative subset satisfying the budget value. Coverage computations include determining how many points of the original dataset lie within the neighborhood size of any member of the selected representative subset and finding the ratio of that number and the total number of points in the original dataset.

Selection method program 150, optimizes the coverage value with respect to the neighborhood size in selecting the new neighborhood size for the next overall set representative subset selection iterations. After coverage has been optimized for maximal coverage, the methods and systems provide the selected representative subset for use in training the target ML models of interest.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
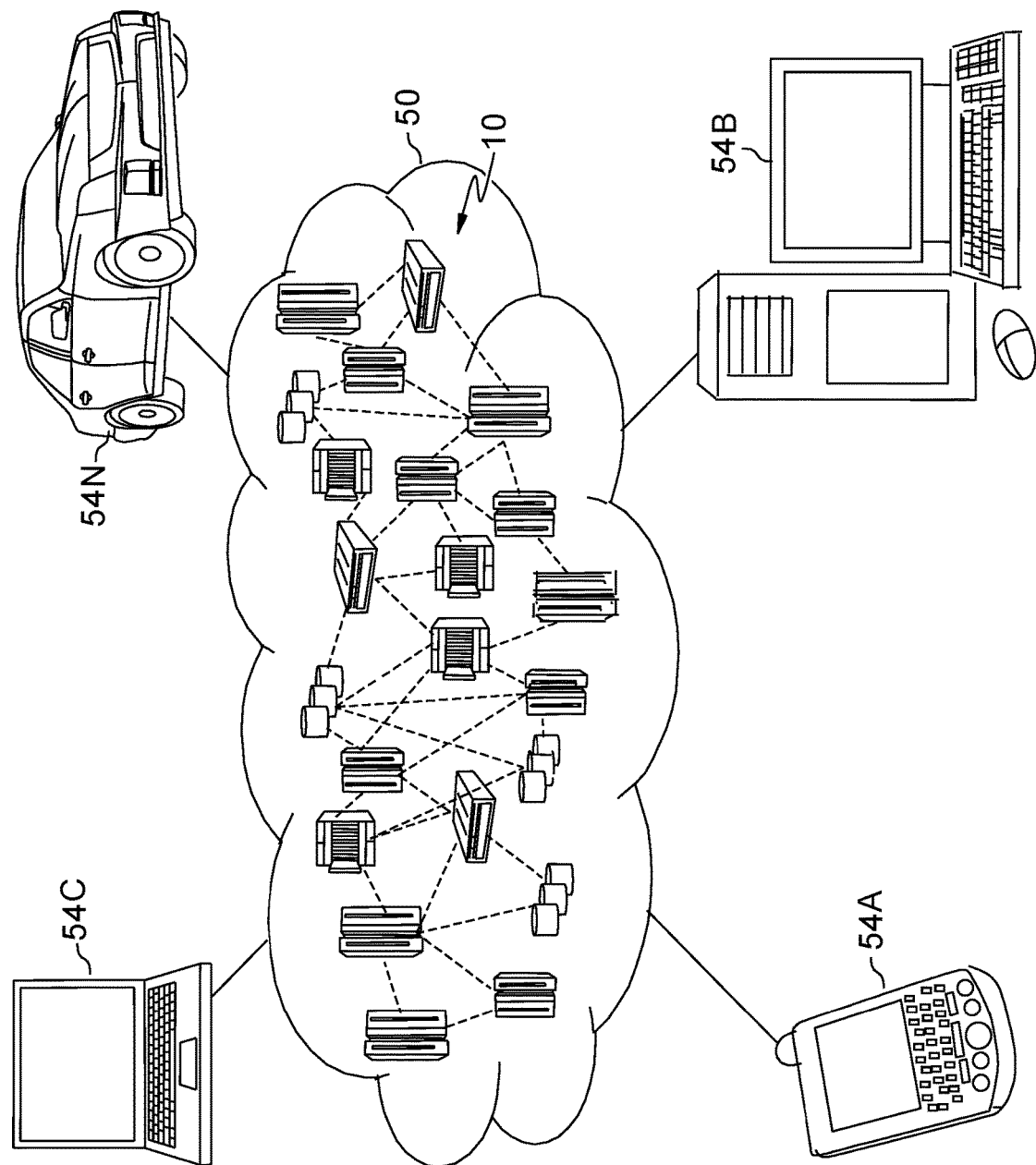
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
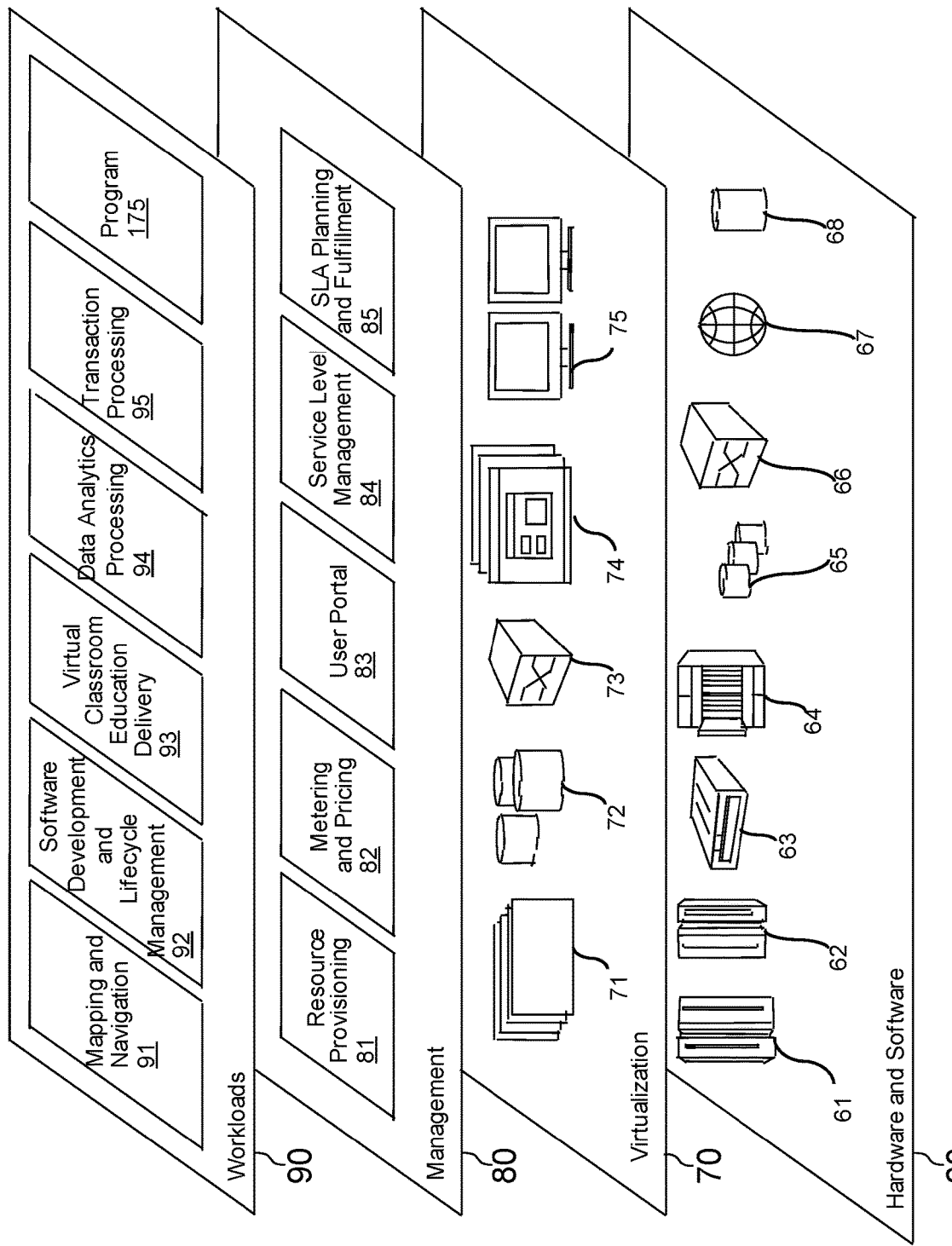
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and training data set selection program 150.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for providing a representative dataset from an initial dataset, the method comprising:

accessing, by a computing device, a dataset associated with a machine learning model;

receiving, by the computing device, input parameters associated with the representative dataset selection, the input parameters including an evaluation metric;

determining, by the computing device, a density of a plurality of datapoints associated with the dataset;

training, by the computing device, a first iteration of the machine learning model using a first data point selected according to the density;

determining a first value of the evaluation metric for the first iteration of the machine learning model;

identifying, by the computing device, neighbors and non-neighbors of the first data point;

determining, by the computing device, a dissimilarity between the first data point and all non-neighbors; and training, by the computing device, a second iteration of the machine learning model using a second point selected according to the dissimilarity;

determining, by the computing device, a second value of the evaluation metric for the second iteration of the machine learning model;

generating, by the computing device, the representative dataset based on the second value of the evaluation metric;

training a final machine learning model using the representative dataset and providing, by the computing device, the representative dataset and the final machine learning model trained using the representative dataset.

2. The computer implemented method according to claim 1, further comprising changing, by the computing device, all neighbors to inactive, and determining a dissimilarity between the first data point and all active points.

3. The computer implemented method according to claim 1, wherein the input parameters comprise a neighborhood size.

4. The computer implemented method according to claim 3, further comprising evaluating, by the computing device, a coverage according to the neighborhood size, wherein determining a coverage of the representative dataset comprises determining a ratio of points directly reachable from a point in the representative dataset and all points in the initial dataset.

5. The computer implemented method according to claim 1, further comprising:
receiving a target column as user input;
determining a correlation between dataset columns and the target column; and
retaining data point column values according to the correlation.

6. The computer implemented method according to claim 1, further comprising:
defining, by the computing device, a budget;
evaluating, by the computing device, all initial dataset points without reaching the budget;
changing, by the computing device, all points not in the representative dataset to active;
training, by the computing device, a third iteration of the machine learning model using a third point selected according to the density;
determining, by the computing device, a third value of the evaluation metric for the third iteration of the machine learning model; and
generating, by the computing device, a representative subset based on the third value of the evaluation metric value.

7. A computer program product for providing a representative dataset from an initial dataset, the computer program product comprising one or more computer readable storage media and collectively stored program instructions on the one or more computer readable storage media, the stored program instructions comprising:
program instructions to access a dataset associated with a machine learning model;
program instructions to receive input parameters associated with the representative dataset selection, the input parameters including an evaluation metric;
program instructions to determine a density of a plurality of datapoints associated with the dataset;
program instructions to train a first iteration of the machine learning model using a first data point selected according to the density;
program instructions to determine a first value of the evaluation metric for the first iteration of the machine learning model;
program instructions to identify neighbors and non-neighbors of the first data point;
program instructions to determine a dissimilarity between the first data point and all non-neighbors;
program instructions to train a second iteration of the machine learning model using a second point selected according to the dissimilarity;
program instructions to determine a second value of the evaluation metric for the second iteration of the machine learning model;
program instructions to generate the representative dataset based on the second value of the evaluation metric;
program instructions to train a final machine learning model using the representative dataset and
program instructions to provide the representative dataset and the final machine learning model trained using the representative dataset.

8. The computer program product according to claim 7, the stored program instructions further comprising program instructions to change all neighbors to inactive, and program instructions to determine a dissimilarity between the first data point and all active points.

9. The computer program product according to claim 7, wherein the input parameters comprise a neighborhood size.

10. The computer program product according to claim 9, the stored program instructions further comprising program instructions to evaluate a coverage according to the neighborhood size, wherein determining a coverage of the representative dataset comprises determining a ratio of points directly reachable from a point in the representative dataset and all points in the initial dataset.

11. The computer program product according to claim 7, the stored program instructions further comprising:
program instructions to receive a target column as user input;
program instructions to determine a correlation between dataset columns and the target column; and
program instructions to retain data point column values according to the correlation.

12. The computer program product according to claim 7, the stored program instructions further comprising:
program instructions to define a budget;
program instructions to evaluate all initial dataset points without reaching the budget;
program instructions to change all points not in the representative dataset to active;
program instructions to train a third iteration of the machine learning model using a third point selected according to the density;
program instructions to determine a third value of the evaluation metric for the third iteration of the machine learning model; and
program instructions to generate a representative subset based on the third value of the evaluation metric value.

13. A computer system for providing a representative dataset from an initial dataset, the computer system comprising:
one or more computer processors;
one or more computer readable storage devices; and
stored program instructions on the one or more computer readable storage devices for execution by the one or more computer processors, the stored program instructions comprising:
program instructions to access a dataset associated with a machine learning model;
program instructions to receive input parameters associated with the representative dataset selection, the input parameters including an evaluation metric;

program instructions to determine a density of a plurality of datapoints associated with the dataset;

program instructions to train a first iteration of the machine learning model using a first data point selected according to the density;

program instructions to determine a first value of the evaluation metric for the first iteration of the machine learning model;

program instructions to identify neighbors and non-neighbors of the first data point;

program instructions to determine a dissimilarity between the first data point and all non-neighbors;

program instructions to train a second iteration of the machine learning model using a second point selected according to the dissimilarity;

program instructions to determine a second value of the evaluation metric for the second iteration of the machine learning model;

program instructions to generate the representative dataset based on the second value of the evaluation metric;

program instructions to train a final machine learning model using the representative dataset and program instructions to provide the representative dataset and the final machine learning model trained using the representative dataset.

14. The computer system according to claim 13, wherein the input parameters comprise a neighborhood size.

15. The computer system according to claim 14, the stored program instructions further comprising program instructions to evaluate a coverage according to the neighborhood size, wherein determining a coverage of the representative dataset comprises determining a ratio of points directly reachable from a point in the representative dataset and all points in the initial dataset.

16. The computer system according to claim 13, the stored program instructions further comprising:

program instructions to receive a target column as user input;

program instructions to determine a correlation between dataset columns and the target column; and program instructions to retain data point column values according to the correlation.

17. The computer system according to claim 13, the stored program instructions further comprising:

program instructions to define a budget;

program instructions to evaluate all initial dataset points without reaching the budget;

program instructions to change all points not in the representative dataset to active;

program instructions to train a third iteration of the machine learning model using a third point selected according to the density;

program instructions to determine a third value of the evaluation metric for the third iteration of the machine learning model; and program instructions to generate a representative subset based on the third value of the evaluation metric value.

* * * * *